(12) United States Patent
Jackson (10) Patent No.: US 9,370,826 B2
(45) Date of Patent: Jun. 21, 2016

(54) ROTARY CHUCK FOR A MACHINE TOOL

(71) Applicant: Craig Jackson, Nicholasville, KY (US)

(72) Inventor: Craig Jackson, Nicholasville, KY (US)

(73) Assignee: Adjustable Clamp Company, Chicago, IL (US)

( * ) Notice: Subject to any disclaimer, the term of this patent is extended or adjusted under 35 U.S.C. 154(b) by 643 days.

(21) Appl. No.: 13/644,572

(22) Filed: Oct. 4, 2012

(65) Prior Publication Data

US 2014/0097581 A1    Apr. 10, 2014

(51) Int. Cl.
*B23B 31/39*      (2006.01)
*B23B 31/163*     (2006.01)
*B23B 31/16*      (2006.01)

(52) U.S. Cl.
CPC ..... *B23B 31/16016* (2013.01); *B23B 31/16004* (2013.01); *B23B 31/16012* (2013.01); *B23B 31/16275* (2013.01); *B23B 31/16279* (2013.01); *B23B 31/16295* (2013.01); *B23B 2231/30* (2013.01); *Y10T 279/1941* (2015.01); *Y10T 279/1993* (2015.01)

(58) Field of Classification Search
CPC .............. B23B 31/16016; B23B 31/16275; B23B 31/16295; B23B 31/16004; B23B 31/16012; B23B 31/16279; B23B 2231/30; B23B 31/16; B23B 31/16008; B23B 31/16041; B23B 31/39; Y10T 279/19; Y10T 279/1986; Y10T 279/1993; Y10T 279/32
USPC .......................... 279/123, 124, 114, 115, 116
See application file for complete search history.

(56) References Cited

U.S. PATENT DOCUMENTS

| | | | | |
|---|---|---|---|---|
| 994,911 A * | 6/1911 | Dusenbery | .................... | 279/123 |
| 1,063,917 A * | 6/1913 | Gates | ................ | B23B 31/16275 |
| | | | | 279/123 |
| 2,358,049 A * | 9/1944 | Bogart | .................... | B23B 31/28 |
| | | | | 279/114 |
| 2,706,093 A * | 4/1955 | Cline | .................... | A22C 11/003 |
| | | | | 242/529 |

(Continued)

FOREIGN PATENT DOCUMENTS

| | | |
|---|---|---|
| DE | 27 08 755 A1 | 9/1978 |
| DE | 3838347 A1 * | 5/1990 ........ B23B 31/16008 |

(Continued)

OTHER PUBLICATIONS

PCT Notification of Transmittal of the International Search Report and the Written Opinion of the International Searching Authority, or the Declaratiion, International Searching Authority, International Application No. PCT/US2013/062546, mailed Feb. 5, 2014, 10 pages.

*Primary Examiner* — Eric A Gates
*Assistant Examiner* — Paul M Janeski
(74) *Attorney, Agent, or Firm* — Levenfeld Pearlstein, LLC (57) ABSTRACT

A rotary chuck includes a housing for rotation about an axis, keyways in the housing which extend radially away from the axis, jaw assemblies slidably received in the keyways and an actuating mechanism as well as a speed ring for moving the jaw assemblies along the keyways in accordance with different gear ratios. Each jaw assembly includes an inner jaw keyed to the associated keyway adjacent to the bottom thereof and an outer jaw keyed to the associated keyway near a mouth thereof so that the jaws can slide independently along their respective keyways. Each jaw assembly also has a locking device for locking its jaws together when they are opposite one another to prevent their relative radial movement and means enabling release of the locking device from the outside to permit ready removal of the outer jaw from its keyway.

12 Claims, 10 Drawing Sheets

(56) References Cited

U.S. PATENT DOCUMENTS

| | | | | |
|---|---|---|---|---|
| 2,726,093 | A * | 12/1955 | Kalenian | B23B 31/16004 279/116 |
| 2,847,266 | A * | 8/1958 | Biere | E06B 3/4663 16/93 R |
| 3,015,003 | A * | 12/1961 | Simmons | 200/38 B |
| 3,088,746 | A * | 5/1963 | Highberg | B23B 31/16004 279/110 |
| 3,704,022 | A | 11/1972 | Blattry et al. | |
| 4,200,300 | A * | 4/1980 | Rohm | 279/124 |
| 4,270,763 | A * | 6/1981 | Rohm | 279/123 |
| 4,362,306 | A * | 12/1982 | Rohm | 279/121 |
| 4,639,001 | A * | 1/1987 | Berardo | B23B 31/16266 279/121 |
| 4,667,971 | A | 5/1987 | Norton et al. | |
| 4,946,177 | A * | 8/1990 | Barbieux | 279/123 |
| 4,960,285 | A * | 10/1990 | Doi | 279/123 |
| 5,129,662 | A * | 7/1992 | Kempken | 279/123 |
| 6,478,311 | B1 * | 11/2002 | Hinson | 279/123 |

FOREIGN PATENT DOCUMENTS

| | | | | |
|---|---|---|---|---|
| DE | 4016775 C1 * | 4/1991 | | B23B 31/16295 |
| FR | 2623431 A1 * | 5/1989 | | B23B 31/16208 |
| GB | 118 609 A | 7/1918 | | |
| GB | 2 055 312 A | 3/1981 | | |
| JP | S59 47106 A | 3/1984 | | |

* cited by examiner

ROTARY CHUCK FOR A MACHINE TOOL

BACKGROUND OF THE INVENTION

1. Field of the Invention

This invention relates to a rotary chuck of the type used to clamp a workpiece to the rotating shaft of a machine tool in order to profile the workpiece using a cutting tool of one kind or another. It relates more particularly to a so-called universal chuck having a plurality of jaws which move in unison.

2. Background Information

Conventional universal chucks of this general type include a main body or housing having a plurality of keyways formed in the housing which are angularly spaced around, and radiate away from, the rotary axis of the housing and a corresponding plurality of jaw assemblies slidably received in the keyways. Invariably, each jaw assembly includes an inner or master jaw which extends substantially the entire height of the associated keyway and an outer or slave jaw which is releasably fastened to the inner jaw exterior to the housing by at least one fastener which extends through the outer jaw and is threaded into the inner jaw. Each outer jaw has clamping surfaces extending in the general direction of the axis and the surfaces of all the outer jaws collectively form a split ring able to grip a workpiece from the outside by moving the jaw assemblies simultaneously radially inward toward said axis and from the inside by moving the jaw assemblies simultaneously radially outward away from the axis. A typical chuck may have many sets of outer jaws of various shapes and sizes to enable the chuck to clamp to a variety of different workpieces.

In most prior chucks, the jaw assemblies are moved along the keyways between radially inner and outer positions by rotating a pinion in the side of the chuck housing. There also exist chucks which open and close the jaw assemblies using a so-called tommy bar in lieu of a pinion which is rotatable about said axis relative to the housing. Both the pinion and the tommy bar are geared to the master jaws so that when they are rotated in one direction or the other, the jaw assemblies are moved radially in or out along the keyways.

The prior chucks are disadvantaged in that their outer jaws are secured to their inner jaws by threaded fasteners. This means that when it is necessary to change the outer jaws to accommodate a different workpiece, the fasteners in all of the jaw assemblies must be unscrewed to enable removal of the existing outer jaws and then screwed back in and tightened with the proper torque to secure the new set of outer jaws. Considering that some chucks may have as many as six jaw assemblies, the replacement of the outer jaws of a given chuck can be a tedious and time consuming task. Also, during the jaw replacement process there is a great potential for one or more fasteners to be soiled, misplaced or lost thereby prolonging the process and extending the downtime of the associated machine tool. The replacement of the jaws is particularly arduous for less skilled workers and those with some loss of manual dexterity.

Another drawback of the prior chucks is that it takes several revolutions of the pinion in order to move the jaw assemblies a significant distance along their respective keyways. Therefore, the act of clamping the chuck to a workpiece can take an excessive amount of time. More importantly, even when the chuck is firmly engaged to the workpiece, there is a limit to the amount of torque that can be applied to the workpiece by a cutting tool when the workpiece is being rotated. This is because, as noted above, the outer jaws of the chuck are connected to the inner jaws exterior to the housing only by way of the threaded fasteners. That is, the outer jaws are not directly connected to the housing. Therefore, during operation of the chuck, there is a potential for fastener failure which could result in an outer jaw being propelled away from the rotating chuck and causing injury and part damage.

SUMMARY OF THE INVENTION

Accordingly, this invention aims to provide a rotary chuck whose outer jaws can be changed quickly without requiring the removal of any fasteners.

Another object of the invention is to provide a chuck of this type whose jaw assemblies are designed so that any torque or cutting forces applied to the outer jaws of the assemblies is coupled directly to the chuck body or housing.

Still another object of the invention is to provide such a chuck having two different actuating mechanisms for moving the jaw assemblies between clamping and unclamping positions in accordance with two different gear ratios.

Yet another object of the invention is to provide a chuck whose jaw type and position can be set up for different workpieces easily even by relatively unskilled personnel.

Other objects of the invention will, in part, be obvious and will, in part, appear hereinafter.

The invention accordingly comprises the features of construction, combination of elements and arrangement of parts which will be exemplified in the construction hereinafter set forth and the scope of the invention will be indicated in the claims.

Briefly, the present chuck comprises a housing or main body adapted to be rotated about a housing axis and formed with a plurality of keyways spaced angularly around, and extending radially away from, that axis. A corresponding plurality of jaw assemblies are slidably received in the keyways and an actuating mechanism may move the jaw assemblies radially along their respective keyways simultaneously between radially inner and outer positions.

It is a feature of the invention that each jaw assembly includes an inner or master jaw having a key portion keyed to the keyway adjacent to the bottom thereof as well as an outer jaw having a key portion keyed to the keyway near the mouth thereof so that those jaws can slide independently along the associated keyway. In other words, the outer jaw as well as the inner jaw are slidably connected directly to the housing. The outer jaw of each jaw assembly also has a clamping portion projecting from the associated keyway in the general direction of the axis for engaging a workpiece.

As we shall see, each jaw assembly includes a locking device for locking the inner and outer jaws together when they are opposite one another to prevent their relative radial movement in the associated keyway. The locking device is internal to the jaw assembly yet can be accessed from the outside. To replace the outer jaw of a jaw assembly, it is only necessary to disengage its locking device thereby allowing the outer jaw to be separated from the associated inner jaw and slid out of its keyway to be replaced by a new outer jaw. The new jaw may be inserted into the keyway and slid into superposition with the inner jaw whereupon it is automatically locked in place by the locking device. Thus, the replacement of an outer jaw set can be accomplished easily by simple manual movements and without the handling of small parts such as fasteners.

It is also a feature of the invention that the jaw assemblies can be moved along their respective keyways using two different actuating mechanisms having two different gear ratios. One actuating mechanism includes a scroll plate mounted for rotation about the axis. The scroll plate has a spiral tooth on one face that meshes with teeth formed on the undersides of the inner jaws and a circular gear rack on the other face having teeth which mesh with one or more pinions rotatably mounted in the side of the housing such that rotation of a pinion moves the jaw assemblies radially in or out along their respective keyways in unison a selected distance per revolution of the pinion. The second actuating mechanism includes a ring gear which is rotatable about the axis and has teeth which mesh with each pinion so that by rotating the ring gear in one direction or the other, the jaw assemblies can be moved in or out a much greater distance for each revolution of the ring gear to expedite the workpiece clamping/unclamping processes.

While we will describe the chuck as used on a wood turning lathe, it should be understood that a comparable chuck incorporating the same principles can be installed on other machine tools such as a computerized numerically controlled milling machine or the like to shape workpieces of metal and other materials.

BRIEF DESCRIPTION OF THE DRAWINGS

For the fuller understanding of the nature and objects of the invention, reference should be made to the following detailed description taken in connection with the accompanying drawings, in which.

DESCRIPTION OF A PREFERRED EMBODIMENT

Figure 1:
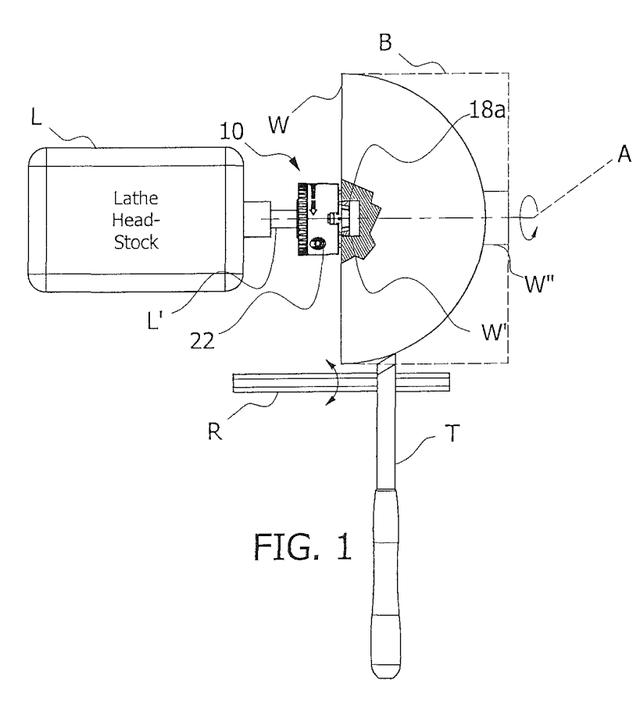
FIG. 1 is a diagrammatic view of a machine tool incorporating a rotary chuck according to the invention.

Refer now to FIG. 1 of the drawings which indicates generally at 10 a rotary chuck incorporating the invention mounted to the shaft L' of a lathe L. Chuck 10 is clamped to the wall of a recess or pocket W' of a workpiece W so that when lathe L is operative, the workpiece is rotated about an housing axis A. While the workpiece is rotating, it may be shaped from a wood block B by manipulating a cutting tool T resting on a tool rest R while appropriately repositioning the tool rest in a well known manner to form, for example, the outside surface of a wood bowl. To hollow out inside of the bowl, the chuck may be clamped around a residual base W'" on the outside of the workpiece W.

Of course, a chuck similar to chuck 10 could also be mounted to the rotary shaft of a milling machine or the like and clamped to a metal or plastic workpiece in which case the cutting tool may be one of the bits of the milling machine.

Figure 2A:
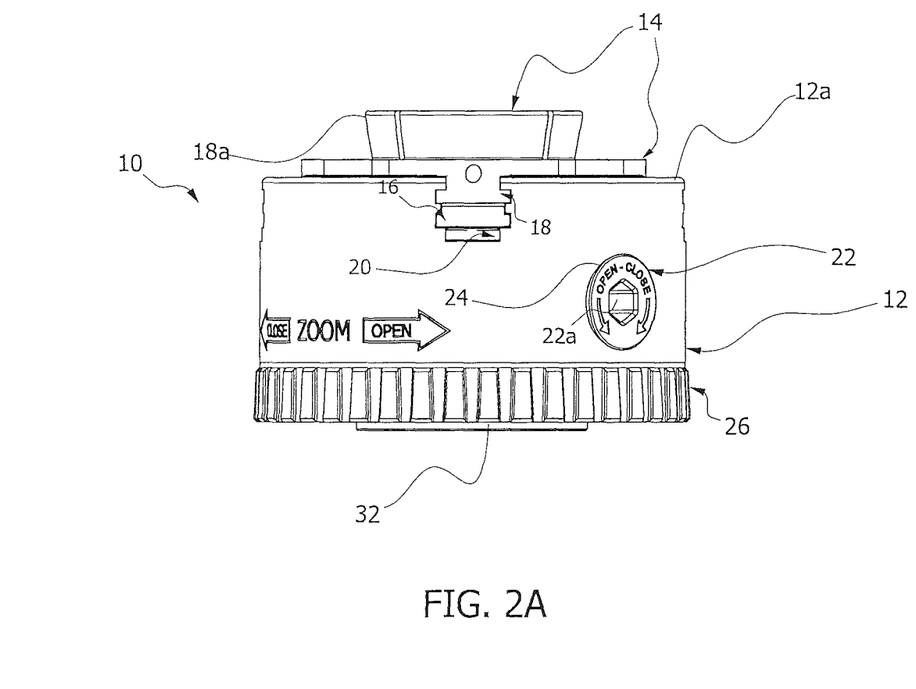
FIG. 2A is a side elevational view, on a larger scale, showing the chuck in FIG. 1.
Figure 2B:
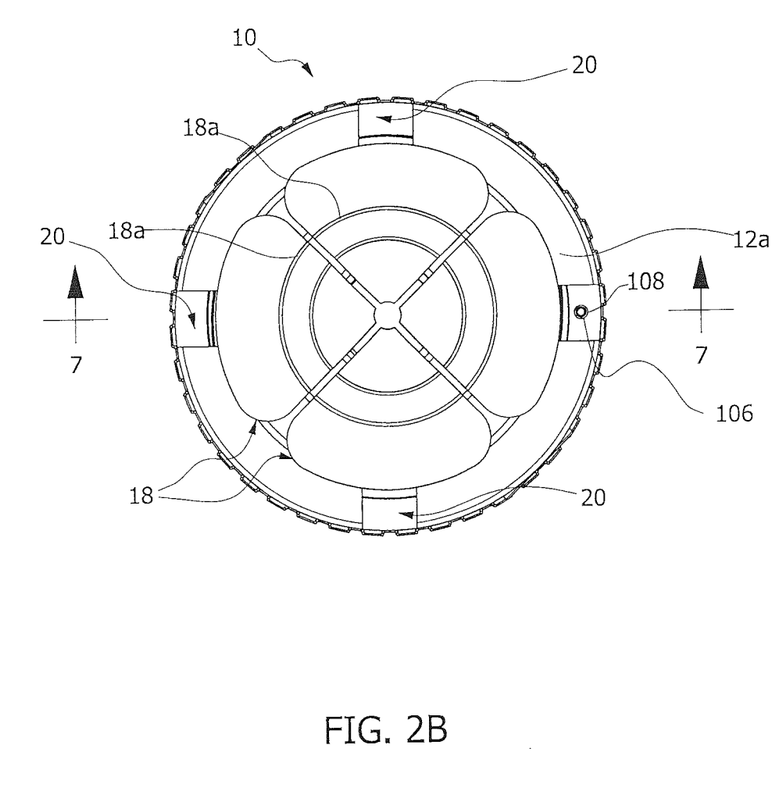
FIG. 2B is a top plan view thereof.
Figure 3A:
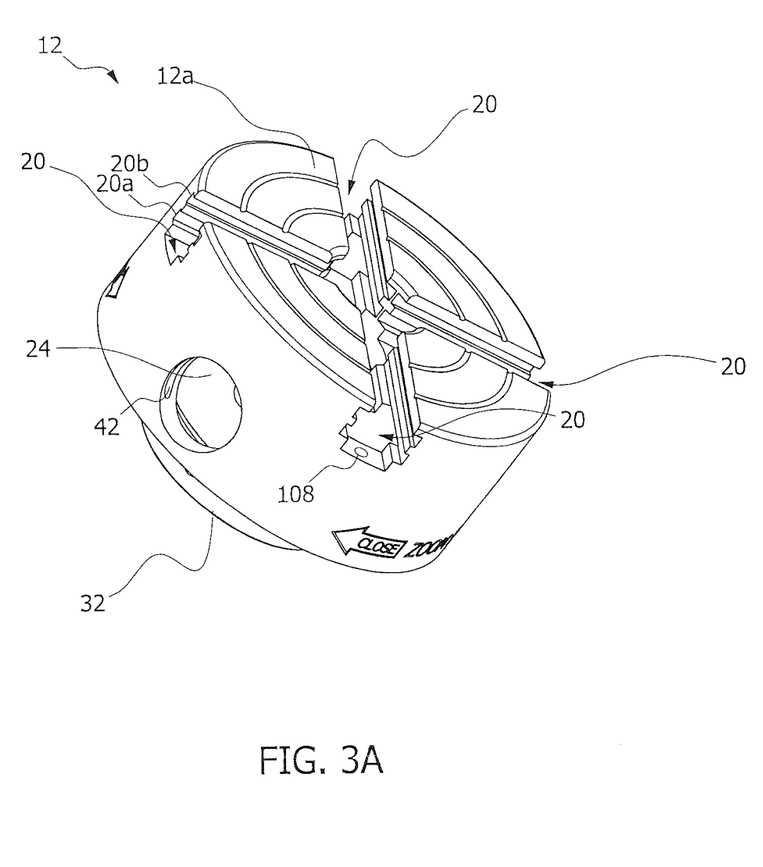
FIG. 3A is a perspective view showing the housing of the FIG. 2 chuck without any internal parts.
Figure 3B:
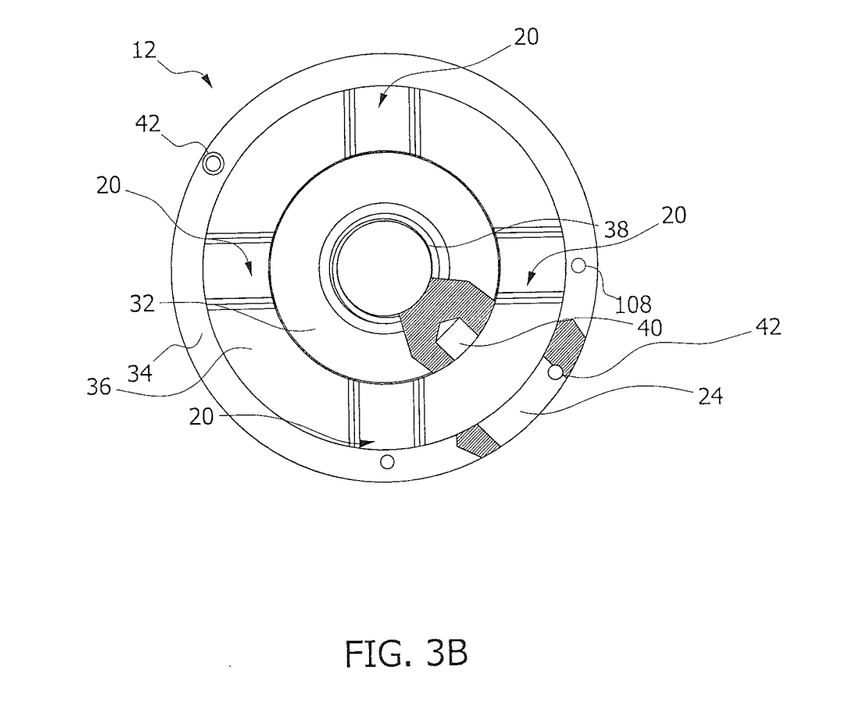
FIG. 3B is a bottom plan view thereof with some portions broken away.
Figure 3C:
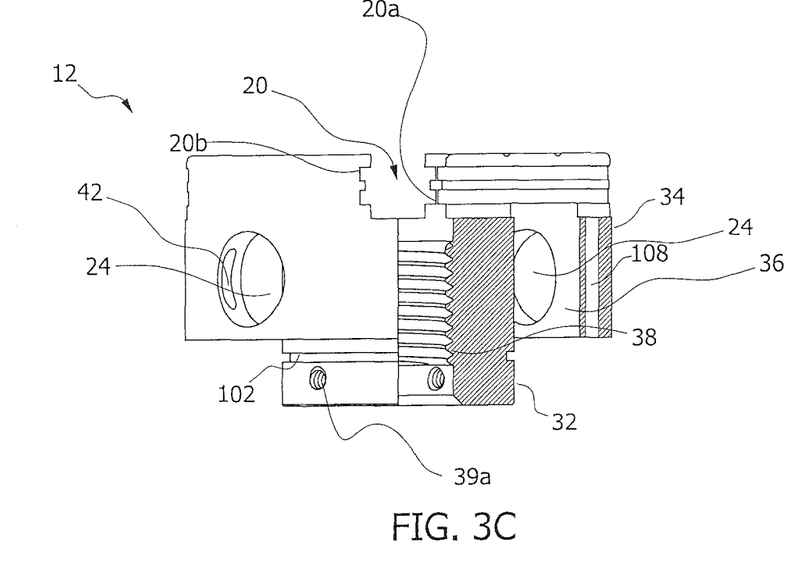
FIG. 3C is a side elevational view thereof with some portions shown in section.

Referring now to FIGS. 2A, 2B and 3, chuck 10 comprises a cylindrical main body or housing 12 that supports a plurality of jaw assemblies indicated generally at 14. The illustrated chuck has four assemblies 14. However, a given chuck may have as few as two such assemblies; others may have three, four, five or more. In any event, each assembly 14 includes a master or inner jaw 16 and a slave or outer jaw 18 both of which are keyed into a radial keyway shown generally at 20 in an outer surface 12a of body 12. Thus, the illustrated chuck 10 has four such keyways angularly spaced 90° apart to accommodate the four jaw assemblies 14. Chuck 10 also has a first actuating mechanism including at least one pinion indicated at 22 rotatably mounted in an opening 24 in the cylindrical wall of housing 12. The illustrated chuck has two such pinions at diametrically opposite locations on the housing. By rotating a pinion 22 in one direction or the other, the jaw assemblies 14 may be moved in unison radially in or out along their respective keyways 20 to clamp the chuck to a workpiece.

Figure 4:
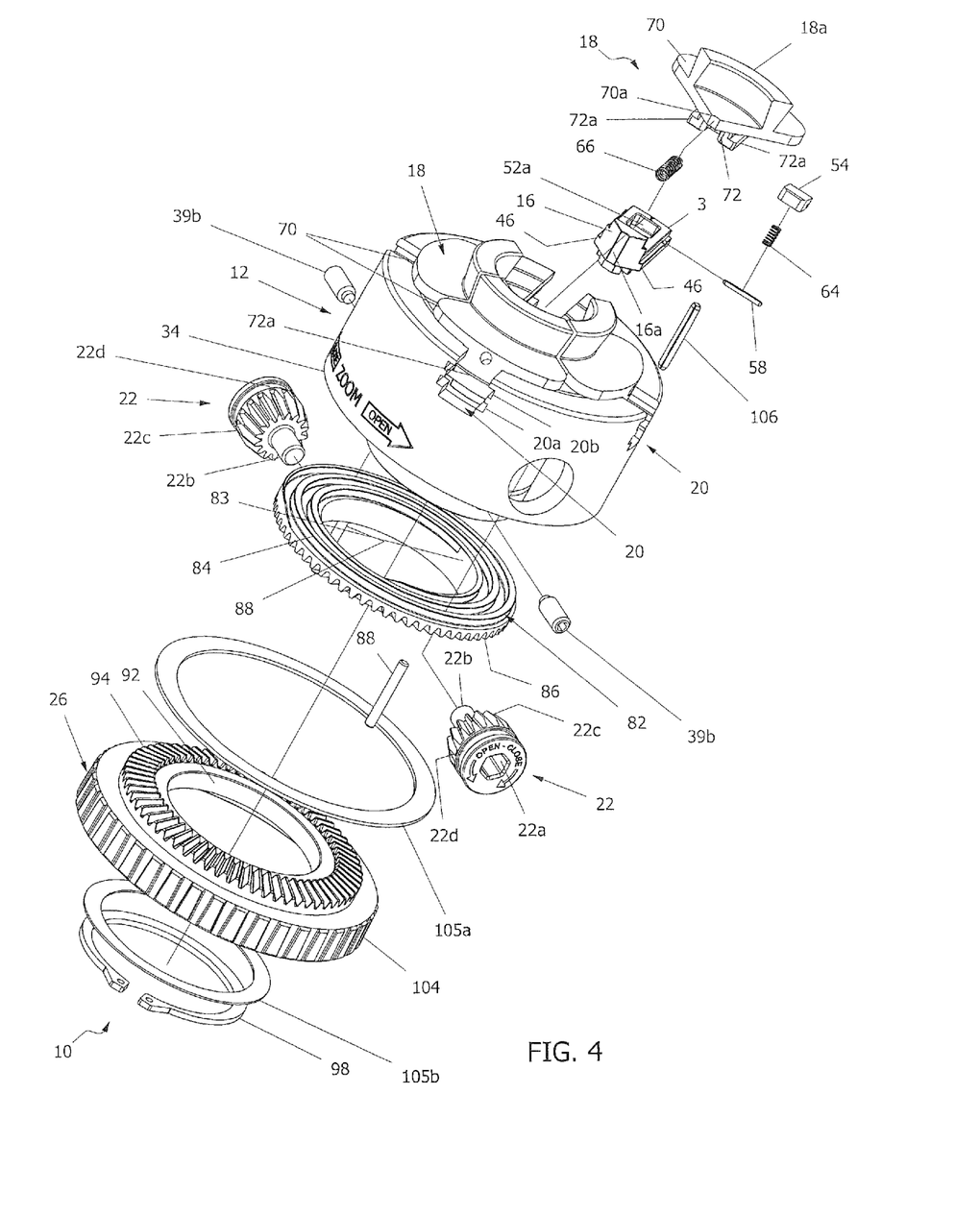
FIG. 4 is an exploded perspective view on a still larger scale showing the components of the chuck in greater detail.

To effect such clamping, the outer jaw 18 of each jaw assembly 14 is formed with an arcuate projection 18a extending in the general direction of, and centered on, the axis A. The projections 18a collectively form a split ring which extends axially out from the chuck housing 12. As best seen in FIG. 4, the projections 18a have a dovetail-shaped cross-section so that the side walls of those projections can interfit with either inside or outside surfaces of the workpiece W when the chuck is clamped to the workpiece. Thus, by turning a pinion 22 in one direction, the jaw assemblies 14 may be moved radially outward from axis A so that their projections 18a engage and interfit with the side wall of the pocket W' of workpiece W as shown in FIG. 1. By the same token, if workpiece happens to have a protuberance W" (FIG. 1), the pinion 22 may be rotated in the opposite direction to draw assemblies 14 radially inward toward axis A to clamp around that protuberance. Of course, the projections 18a may have various other shapes that will effectively clamp to different workpieces.

Preferably pinion 22 is formed to facilitate its rotation. The illustrated pinion 22 has a hexagonal recess 22a to enable the pinion to be turned by a conventional hex wrench (not shown). However, each pinion 22 could just as well be formed with a blade slot, or non-cylindrical protuberance to facilitate its turning by a tool of one kind or another.

Instead of just having a pinion to move the jaw assemblies which may take many turns of the pinion, chuck 10 includes a second actuating mechanism for rapidly opening and closing the jaws by rotating a so-called zoom or speed ring 26 mounted to the inner end of main body 12 for rotation about axis A. By manually turning ring 26, the jaw assemblies 14 may be drawn rapidly into contact with a workpiece to ready them for final tightening by turning a pinion 22 with a hex wrench or by torqueing the ring using a lever arm inserted into a hole (not shown) in the edge of the ring.

As noted previously, the outer jaws 18 of jaw assemblies 14 are all keyed directly into the main body 12. Consequently, when chuck 10 is in use, substantially all the torsional forces caused by cutting of the workpiece are transferred from the outer jaw directly to the main body 12 rather than to that body by way of fasteners and the inner jaws as with prior chucks of this general type.

Also as we shall see, the assembly outer jaws 18 having projections 18a of a particular dimension or shape to clamp to a particular workpiece W may be replaced readily by other outer jaws 18 whose projections 18a are shaped and dimensioned to clamp to a differently dimensioned and shaped workpiece. It makes no difference which outer jaw 18 or replies which master jaw 16 and no threaded fasteners are required to secure the outer jaws 18 as is the case with prior chucks.

Referring particularly to FIGS. 3A-3C, main body 12 is formed with a central barrel 32 and an outer skirt 34 both extending inward from the outer surface 12a of body 12 leaving an annular gap 36 between the barrel and the skirt. The pinion openings 24 are located in skirt 34 and the interior wall of barrel 32 is threaded at 38 to facilitate its attachment to the lathe shaft L' (FIG. 1). As best seen in FIG. 3C, at least one radial threaded hole 39a is present in the wall of barrel 32 to receive a set screw 39b (FIG. 4). When tightened against the lathe spindle L (FIG. 1), the screw(s) prevent loosening of the chuck when the spindle is rotated in reverse.

As shown in FIG. 2A, each keyway 20 in the main body 12 has an inner keyway portion 20a adjacent the bottom of the keyway for slidably receiving the corresponding inner or master jaw 16 and an outer keyway portion 20b at the mouth of the keyway for slidably receiving the associated outer or slave jaw 18. As best seen in FIG. 3B, the keyways 20 radially inboard skirt 34 have no floors, but rather openings 39 into gap 36.

Referring to FIGS. 3B and 3C, barrel 32 is formed with a radial pinion socket 40 opposite each opening 24 and in order to rotatably retain each pinion 22 in its socket 40 and skirt opening 24, a lengthwise passage 42 is provided in skirt 34 which intercepts each opening 24. As we shall see, each opening 42 is designed to receive a pin which interfits with the corresponding pinion 22 to fix the pinion axially, yet allow it to rotate.

Figure 5A:
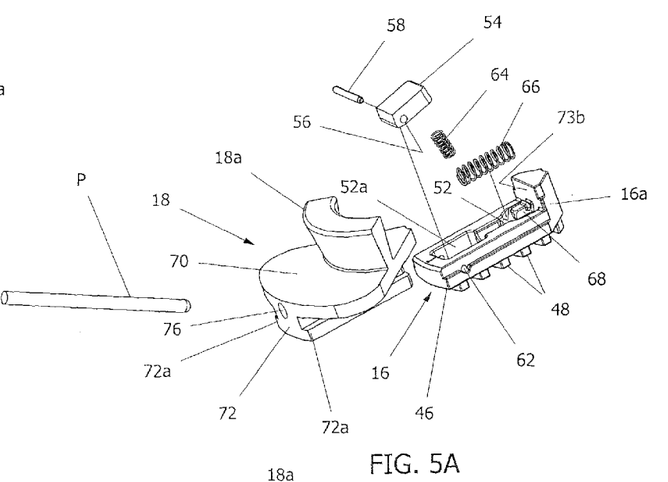
FIG. 5A is a similar view showing a jaw assembly of the chuck.
Figure 5B:
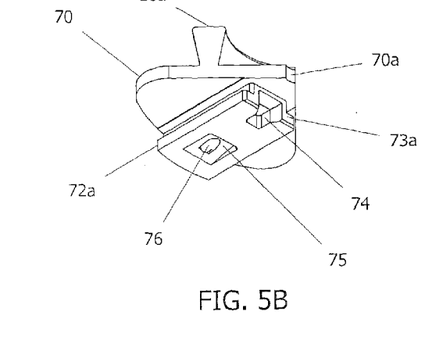
FIG. 5B is a bottom view of the outer jaw of the FIG. 5A assembly.

Turning now to FIGS. 4 and 5, each inner jaw 16 is generally rectangular in shape and has a pair of laterally extending flanges 46 which together form a key which keys into the inner keyway portion 20a of the corresponding keyway 20 in main body 12 as shown in FIG. 2A. Also, inner jaw 16 has a lengthwise series of spaced-apart arcuate depending teeth 48 which project through the bottom opening 39 (FIG. 3B) of the associated keyway into gap 36 to facilitate moving jaw 16 along its keyway portion 20a as will be described later.

In addition, a lengthwise channel 52 is formed in the top of inner jaw 16 which channel is widened at its inner end to form a chamber 52a. Chamber 52a is sized to snugly receive a generally rectangular keeper 54 which has a lateral passage 56 near one end to receive a pin 58 whose ends are received in holes 62 at opposite sides of chamber 52a so that the keeper can pivot up and down in chamber 52a. A keeper spring 64 is compressed between the free end of keeper 54 and the bottom of chamber 52a to bias the free end of the keeper upward, i.e. toward the overlying outer jaw 18. It is important to note that when the chuck is in operation, the keeper pin 58 carriers no load; it simply holds the keeper in place. Of course as will be described later, the keeper itself bears a load when engaged to the outer jaw.

Figure 6A:
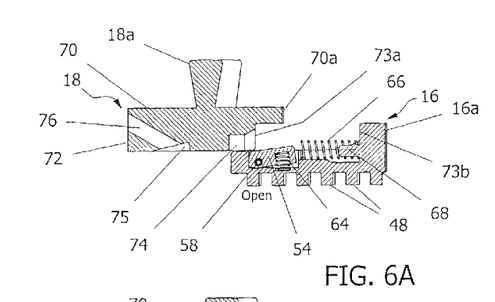
FIGS. 6A-6D are sectional views illustrating the operation of the FIG. 5 jaw assembly.

Also a master spring 66 is positioned between the free end of the keeper and a prominent, upwardly extending nose 16a present at the radially inner end of jaw 16 for reasons that will become apparent. Preferably, as best seen in FIGS. 5A and 6A, the radially inner end of the spring is held in place by a retention post 68 protruding into channel 52 from jaw nose 16a. The post may have a triangular cross-section and a bump or rib over which the spring end is forced to retain it on the post.

Still referring to FIGS. 4 and 5, the outer or slave jaw 18 is designed and dimensioned to sit in its keyway portion 20b above the inner or master jaw 16 and is slidable radially relative thereto. Jaw 18 comprises a generally triangular plate 70 that supports the arcuate projection 18a. A generally rectangular rib 72 depends from plate 70 and a pair oppositely extending lateral flanges 72a are present at the bottom of that rib to form a key adapted to key into the outer keyway portion 20b as shown in FIG. 4. When a jaw 18 is disposed directly opposite, e.g. superimposed on, the associated jaw 16, the flanges 72a are disposed directly opposite flanges 46 of the inner jaw and a pointed end 70a of plate 70 overlies inner jaw nose 16a as seen from FIGS. 6C and 7. Also, the jaws 16 and 18 have stopping surfaces 73a and 73b, respectively, which engage one another when the jaws are so positioned to prevent movements of jaw 18 relative to jaw 16 toward axis A. This is the locked position of the jaws 18 shown in FIG. 6C. Jaw 18 may be moved between that position and an unlocked position illustrated in FIG. 6A.

As best seen in FIG. 6A, a recess 74 is formed in the radially inner end of rib 72. That recess opens to the underside of the rib so that as jaw 18 is moved from its unlocked position shown in FIG. 6A toward its locked position as shown in FIG. 6C, the free end of spring 66 is captured in recess 74 so that further relative movement of jaw 18 to the locked position shown in FIG. 6C results in compression of spring 66 which therefore biases jaw 18 radially outward toward its unlocked position in FIG. 6A. The movement of jaw 18 from its unlocked position of FIG. 6A to its locked position shown in FIG. 6C results in the depression of keeper 54 in opposition to the upward bias of its spring 64 so that as shown in FIG. 6B, jaw 18 rides over keeper 54 on its way to the locked position shown on FIG. 6C.

Figure 6B:
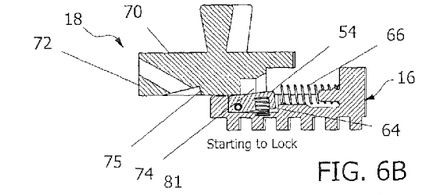
Figure 6C:
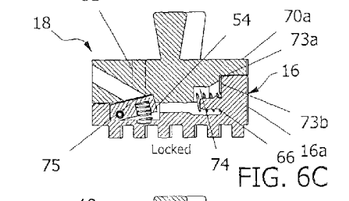

As shown in FIGS. 5B and 6A to 6D, the underside of rib 72 of outer jaw 18 is formed with a generally triangular notch 75 midway along its length. When jaw 18 is moved relative to jaw 16 toward its locked position, the underside of rib 72 engages and depresses keeper 54 as shown in FIG. 6B so that jaw 18 slides over the keeper on its way to the locked position shown in FIG. 6C. When jaw 18 reaches that locked position wherein stopping surfaces 73a and 73b are in engagement, keeper 54 is urged upward by its spring 64 so that the keeper engages tightly in the notch 75 whose radially inner wall function as a stop thereby retaining jaw 18 in the locked position opposite jaw 16, despite the bias of the now fully compressed spring 66. Thus, during operation of the chuck, any load applied to its outer jaw 18 will be transferred via keeper 54 itself and inner jaw 16 to the chuck housing or body 12. That is, the keeper pin 58 carries no load.

Figure 6D:
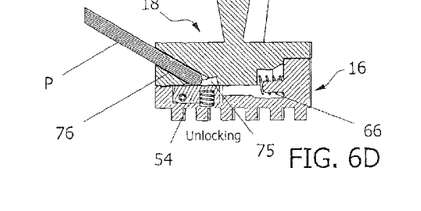

Each jaw 18 is also formed with a passage 76 extending from the radially outer end of the jaw to its notch 75. When it is necessary to change or replace jaw 18, this may be accomplished simply by momentarily inserting a jaw release pin P into the outer end of its passage 76 until the pin engages and depresses keeper 54 as shown in FIG. 6D so that the keeper is retracted from notch 75 thereby allowing spring 66 to urge the jaw 18 to its unlocked position shown in FIG. 6A whereupon the jaw may be slid out of its keyway portion 20b in housing 12. Of course, other means may be used to depress each keeper. For example, a pin-receiving passage extending parallel to axis A may be provided in outer jaw 18 that is opposite keeper 54 when the two jaws are opposed as shown in phantom at 81 in FIG. 6C. Also, pin P could be the stem of a spring-loaded push button mounted in outer jaw 18.

Figure 7:
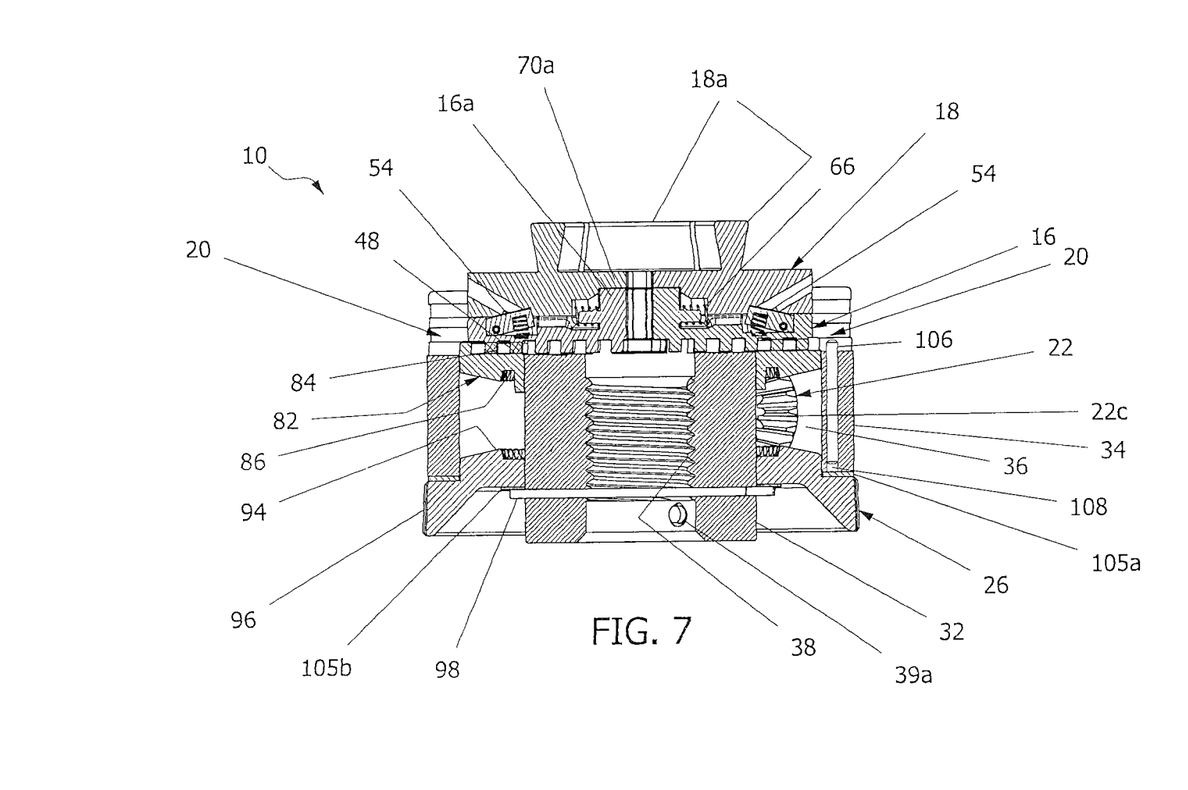
FIG. 7 is a sectional view taken along lines 7-7 of FIG. 2B showing the chuck parts as assembled.
Figure 8:
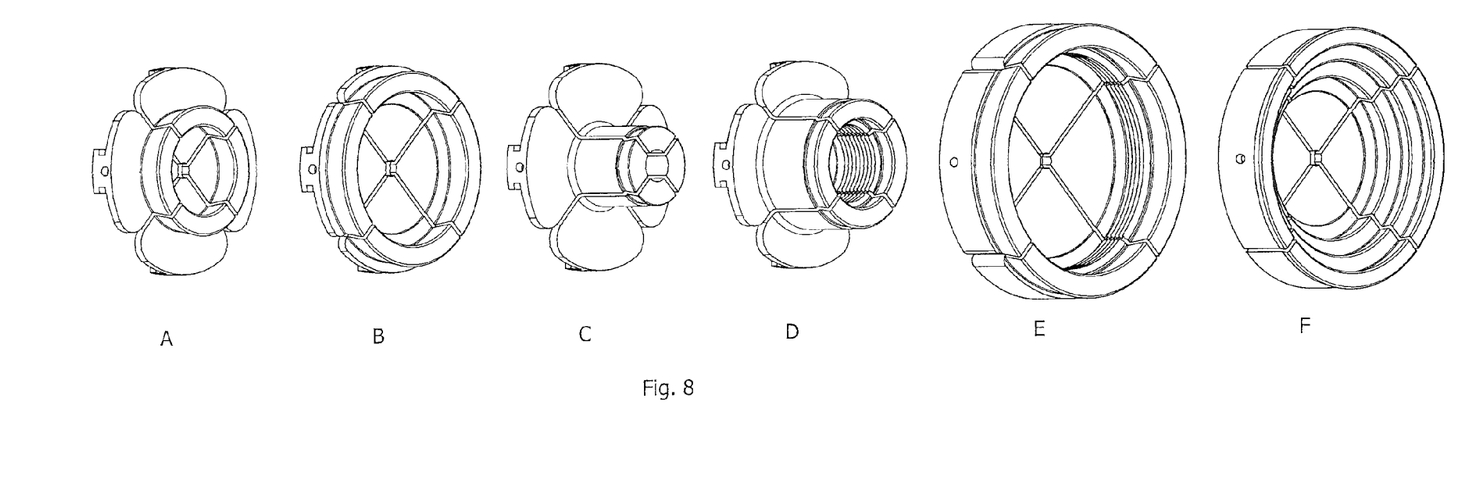
FIGS. 8A-8F are illustrative of some outer jaw configurations that may be used in the FIG. 2 chuck.

When the inner or master jaw 16 of each jaw assembly 14 is keyed into its keyway portion 20a as shown in FIGS. 4 and 7, the teeth 48 of that jaw project through the bottom opening 39 into the gap 36 between the barrel 32 and skirt 34 of main body 12. Thus, when all four jaws are in place, they combine to form an annular split gear rack composed of radially spaced-apart arcuate teeth extending into housing gap 36 and centered on axis A.

As best seen in FIGS. 4 and 7, chuck also includes a so-called scroll ring 82 having a spiral thread 84 projecting from its outer side and an annular array of teeth 86 extending from its inner side. Ring 82 has a central opening 83 dimensioned to receive barrel 32 so that the ring fits in the gap 36 of main body 12 and can rotate about axis A with the convolutions of the spiral thread 84 interfitting with the teeth 48 of all four inner jaws 16. When the ring is rotated in one direction, the four master jaws 16 are urged radially outward along their respective keyways 20 away from axis A and when ring 84 is rotated in the opposite direction, those jaws are drawn inwardly toward axis A. Of course, when the outer jaws 18 are locked to their inner jaws 16 as described above, the outer jaws and jaw assemblies 14 as a whole move in a corresponding fashion.

The scroll ring 82 may be rotated by one or the other of the pinions 22. Each pinion includes an axial shaft 22b rotatably seated in a socket 40 (FIG. 3B) in barrel 32 of main body 12. Each pinion also includes a set of teeth 22c and a circumferential groove 22d. When each pinion is properly received in its opening 24, the teeth 22c mesh with the teeth 86 of scroll ring 82 and groove 22d is disposed opposite the corresponding pin passage 42 (FIGS. 3B and 3C) in skirt 34. The pinions may be rotatably retained in place by inserting pinion pins 88 (FIG. 4) into those passages 42 whereby the pins intercept the grooves 22d in the pinions so that the pinions are fixed axially but free to rotate. By rotating one or the other of the pinions 22 using a suitable tool, the scroll ring 82 may be rotated in one direction or the other thereby radially opening or closing jaw assemblies 14.

The gear ratio provided by the first actuating mechanism comprising pinions 22, ring 82 and jaw teeth 48 may be quite high so that it may take several turns of a pinion to radially translate gear assemblies 14 a meaningful distance along the keyways 20. Accordingly, the second actuating mechanism including the zoom or speed ring 26 may be used to enable an operator to quickly translate the jaw assemblies 14 to come into contact with a particular workpiece. Thereafter, a pinion 22 may be rotated to tightly clamp the jaw assemblies to that workpiece.

As best seen in FIGS. 4 and 7, the speed ring 26 has an inner wall 92 sized to engage around housing barrel 32 so that it is rotatable about axis A. Formed in the outer face of the ring is an annular gear having teeth 94 which mesh with the teeth 22c of the pinions 22 when the speed ring is positioned on barrel 32. Ring 26 is rotatably held in place on barrel 32 by a snap ring 98 which engages in a circular groove 102 near the inner end of barrel 32. Preferably speed ring 26 provides a griping surface in the form of a serrated skirt 104 extending in from the outer surface of the ring. To ease or smooth rotation of the speed ring, an annular spacer 105a is positioned on the barrel between ring 26 and outer skirt 34 and a second similar spacer or shim 105b is provided between the ring and snap ring 98. Preferably these spacers are of a "slippery" plastic material such as acetal resin. Thus, the jaw assemblies 14 may be moved between radially inner and outer positions along the respective keyways 20 to effect clamping of a workpiece by either rotating a pinion 22 or by turning the speed ring 26. Preferably, the latter is used to approximate clamping and the former is used to snug the chuck to the workpiece.

In operation, to engage a particular workpiece W, using speed ring 26, the jaw assemblies 14 may be moved rapidly either outward so that the radially outer surfaces of the jaw projections 18a engage the edge of a pocket in the workpiece or are moved inward so that the radially inner surfaces of those projections engage a workpiece protuberance. Then, the jaw assemblies may be clamped tightly against the workpiece by turning one or the other of pinions 22 using a hex wrench or the like tool. The rotation of either the speed ring 26 or a pinion 22 moves all of the master jaws 16 and therefore all jaw assemblies 14 simultaneously in the chosen direction, albeit in accordance with different gear ratios.

Preferably, though not necessarily, provision is made for preventing the jaw assemblies 14 from traveling along their keyways 20 away from axis A so that less than two teeth 48 of each jaw 16 engage scroll ring 82. This may be accomplished by plugging a jaw stop pin 106 into a passage 108 (FIGS. 3, 4 and 7) at the radially outer end of one or more keyways 20 such that the pin projects axially from skirt 34 at the outer end of the keyway as shown on FIGS. 2B and 7. Of course, other means may be provided to prevent excessive radially outward movement of the jaw assemblies 14, such as by providing a stop (not shown) near the radially outer end of the scroll ring thread 84.

When it becomes necessary to change an outer or slave jaw 18 to accommodate a workpiece of a different shape or size, that may be accomplished easily by inserting the release pin P into passage 76 to depress keeper 54 as shown in FIG. 6D. That allows the outer jaw 18 to be pushed toward its unlocked position by spring 66. Thus, the action of the spring makes it immediately obvious to the user that the outer jaw is disengaged from the keeper. Now the user can slide the jaw out of the associated keyway portion 20b in housing 12 and replace it with another outer jaw whose projection 18a is shaped and dimensioned to accommodate the different workpiece. That replacement outer jaw may be slid into the same keyway portion over the corresponding inner jaw 16 past keeper 54 in that jaw, whereupon the keeper will snap into notch 75 to lock the new outer jaw 18 in place opposite its inner jaw 16. The distinct "snap" sound that the seated keeper makes signals the operator that the inner and outer jaws are engaged. It is obvious that the shapes and/or sizes of the outer jaw 18 are endless. Some examples of same are shown in FIGS. 8A to 8F.

It is important to note that both the inner or master jaw 16 and the outer or slave jaw 18 of each jaw assembly 14 are keyed to housing 12 so that all tortional and lateral forces imparted to the workpiece due to the operations thereon are transferred via the outer jaws 18, sturdy keepers 54 and inner jaws 16 to housing 12. This contrasts with prior chucks wherein these forces are passed to the housing by way of some type of fastener connecting those jaws to their inner jaws. Thus, the present chuck is able to handle most stresses occasioned by the working of a workpiece W.

It will thus be seen that the objects set forth above, among those made apparent from the preceding description, are efficiently attained. Also, certain changes may be made in the above construction without departing from the scope of the invention. For example, the keeper 54 (reversed) and spring 14 could just as well be located in the outer jaw 18 for engagement in a notch 75 (reversed) in the inner jaw 16. Therefore, it is intended that all matter contained in the above description or shown on the accompanying drawings shall be interpreted as illustrative and not in a limiting sense. It is also to be understood that the following claims are intended to cover all of the generic and specific features of the invention described herein.

What is claimed is:

1. A rotary chuck of the type including a housing for rotation about a housing axis, a plurality of keyways formed in the housing, said keyways being angularly spaced around, and extending radially away from, said axis, each of said keyways extending through an outer edge of said housing, a corresponding plurality of jaw assemblies slidably received in the keyways and an actuating mechanism having a selected gear ratio for moving the jaw assemblies along their respective keyways simultaneously between radially inner and outer positions characterized in that each jaw assembly comprises:
- an inner jaw including a key portion keyed to the associated keyway adjacent to a bottom thereof;
- an outer jaw including a key portion keyed to the associated keyway near a mouth thereof so that said inner and outer jaws can slide independently along the associated keyway, said outer jaw also having a clamping portion projecting from the associated keyway in the general direction of said axis for engaging a workpiece;
- a locking device for releasably locking the inner and outer jaws together when they are opposite one another to prevent their relative movement along the associated keyway, and
- means enabling release of the locking device from the outside so that the outer jaw can be moved relative to the inner jaw away from said axis and slid out of the associated keyway,
- wherein the locking device of each jaw assembly includes:
  - stopping surfaces on the inner and outer jaws which engage when the jaws are opposite one another to prevent movement of the outer jaw relative to the inner jaw in a direction toward said axis, and
  - a spring-biased keeper on one of the inner and outer jaws which engages a stop on the other of the inner and outer jaws when the jaws are opposite one another to prevent movement of the outer jaw relative to the inner jaw in a direction away from said axis.

2. The chuck of claim 1 wherein the enabling means comprise a passage in one of the inner and outer jaws allowing passage of a device for engaging and depressing the keeper in opposition to its spring bias to disengage the keeper from said stop.

3. The chuck of claim 2 wherein the device includes an elongated member.

4. The chuck of claim 1 and further including a spring in each jaw assembly that biases the outer jaw away from the corresponding inner jaw in a direction away from said axis.

5. The chuck of claim 1 wherein said actuating mechanism comprises:
- a set of teeth spaced along the length of each inner jaw and projecting through the bottom of the associated keyway;
- a scroll plate rotatably mounted to the housing for rotation about said axis, the scroll plate having one face formed with a spiral gear tooth with spaced-apart convolutions in mesh with gear teeth of the plurality of inner jaws and an opposite face formed with an annular gear rack having teeth extending away from the jaws; and
- one or more pinions rotatably mounted to the housing, each pinion having teeth in mesh with the teeth of the gear rack, said inner jaw teeth sets, rack and one or more pinions being designed and dimensioned so that rotation of a pinion moves the jaw assemblies in accordance with said selected gear ratio.

6. The chuck of claim 5 and further including a second actuating mechanism comprising a ring gear mounted to the housing for rotation about said axis, said ring gear having an exposed gripping surface and teeth in mesh with the teeth of said one or more pinions, said ring gear being designed and dimensioned so that rotation of the ring gear moves the jaw assemblies along their respective keyways.

7. The chuck of claim 1 and further including a second actuating mechanism for moving the jaw assemblies in unison along their respective keyways.

8. The chuck of claim 1 and further including one or more limiting devices for limiting the radial outward movements of the jaw assemblies along their respective keyways.

9. The chuck of claim 1 wherein said clamping portion of each outer jaw comprises a projection in the form of an arc of a circle centered on said axis.

10. The chuck of claim 9 wherein each projection has a cross-section in the shape of a dove tail.

11. A rotary chuck of the type including a housing for rotation about a housing axis, a plurality of keyways formed in the housing, said keyways being angularly spaced around, and extending radially away from, said axis, each of said keyways extending through an outer edge of said housing, a corresponding plurality of jaw assemblies slidably received in the keyways and an actuating mechanism having a selected gear ratio for moving the jaw assemblies along their respective keyways simultaneously between radially inner and outer positions characterized in that each jaw assembly comprises:
- an inner jaw including a key portion keyed to the associated keyway adjacent to a bottom thereof;
- an outer jaw including a key portion keyed to the associated keyway near a mouth thereof so that said inner and outer jaws can slide independently along the associated keyway, said outer jaw also having a clamping portion projecting from the associated keyway in the general direction of said axis for engaging a workpiece;
- a locking device for releasably locking the inner and outer jaws together when they are opposite one another to prevent their relative movement along the associated keyway, and
- means enabling release of the locking device from the outside so that the outer jaw can be moved relative to the inner jaw away from said axis and slid out of the associated keyway,
- wherein the enabling means comprise a passage in one of the inner and outer jaws allowing passage of a device for engaging and depressing the locking device in opposition to a spring bias to disengage the locking device.

12. A rotary chuck of the type including a housing for rotation about a housing axis, a plurality of keyways formed in the housing, said keyways being angularly spaced around, and extending radially away from, said axis, each of said keyways extending through an outer edge of said housing, a corresponding plurality of jaw assemblies slidably received in the keyways and an actuating mechanism having a selected gear ratio for moving the jaw assemblies along their respective keyways simultaneously between radially inner and outer positions characterized in that each jaw assembly comprises:
- an inner jaw including a key portion keyed to the associated keyway adjacent to a bottom thereof;
- an outer jaw including a key portion keyed to the associated keyway near a mouth thereof so that said inner and outer jaws can slide independently along the associated keyway, said outer jaw also having a clamping portion projecting from the associated keyway in the general direction of said axis for engaging a workpiece;
- a locking device for releasably locking the inner and outer jaws together when they are opposite one another to prevent their relative movement along the associated keyway;
- means enabling release of the locking device from the outside so that the outer jaw can be moved relative to the inner jaw away from said axis and slid out of the associated keyway; and
- a spring in each jaw assembly that biases the outer jaw away from the corresponding inner jaw in a direction away from said axis.

* * * * *